United States Patent
Sotiropoulos et al.

(10) Patent No.: US 11,614,767 B2
(45) Date of Patent: Mar. 28, 2023

(54) DEVICE AND METHOD FOR PROVIDING A CLOCK SIGNAL TO AN APPLICATION

(71) Applicant: Hitachi Energy Switzerland AG, Baden (CH)

(72) Inventors: Ioannis Sotiropoulos, Baden (CH); Stephan Gerspach, Baden (CH)

(73) Assignee: Hitachi Energy Switzerland Ltd, Baden (CH)

( * ) Notice: Subject to any disclaimer, the term of this patent is extended or adjusted under 35 U.S.C. 154(b) by 0 days.

(21) Appl. No.: 16/872,126

(22) Filed: May 11, 2020

(65) Prior Publication Data

US 2020/0363832 A1 Nov. 19, 2020

(30) Foreign Application Priority Data

May 10, 2019 (EP) ..................................... 19173956

(51) Int. Cl.
 *G06F 1/12* (2006.01)
 *G06F 1/08* (2006.01)

(52) U.S. Cl.
 CPC . *G06F 1/08* (2013.01); *G06F 1/12* (2013.01)

(58) Field of Classification Search
 CPC ................. G06F 1/08; G06F 1/12; G06F 1/14
 See application file for complete search history.

(56) References Cited

U.S. PATENT DOCUMENTS

| | | | | |
|---|---|---|---|---|
| 5,852,728 A | * | 12/1998 | Matsuda | G06F 11/1604 713/501 |
| 2013/0039359 A1 | * | 2/2013 | Bedrosian | H04J 3/0667 370/350 |
| 2016/0072513 A1 | * | 3/2016 | Dickerson | H03L 7/23 331/16 |
| 2016/0072516 A1 | | 3/2016 | Shill et al. | |
| 2017/0353292 A1 | * | 12/2017 | Thubert | H04W 56/0015 |

FOREIGN PATENT DOCUMENTS

AU 2013101745 A4 3/2016

* cited by examiner

*Primary Examiner* — Paul Yen
(74) *Attorney, Agent, or Firm* — Slater Matsil, LLP

(57) ABSTRACT

Embodiments of the present invention relate to a method and a device for providing a clock signal to an application, comprising (a) determining a time difference between a clock device and the clock signal; if the time difference is above a predetermined threshold x, (b) calibrating a first time unit and, during calibrating the first time unit, (c) using a second time unit for providing the clock signal to the application.

18 Claims, 3 Drawing Sheets

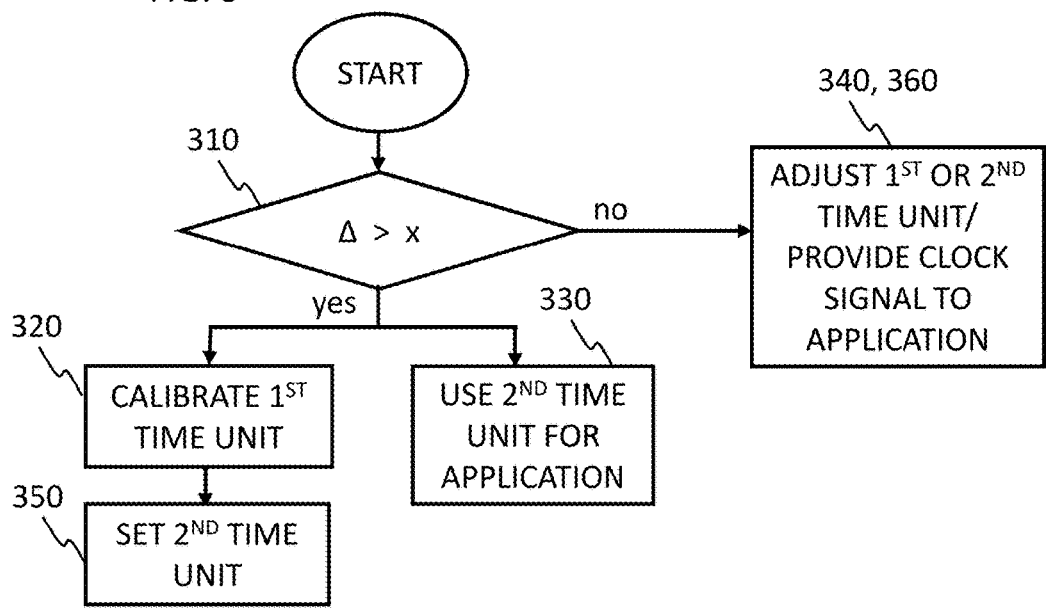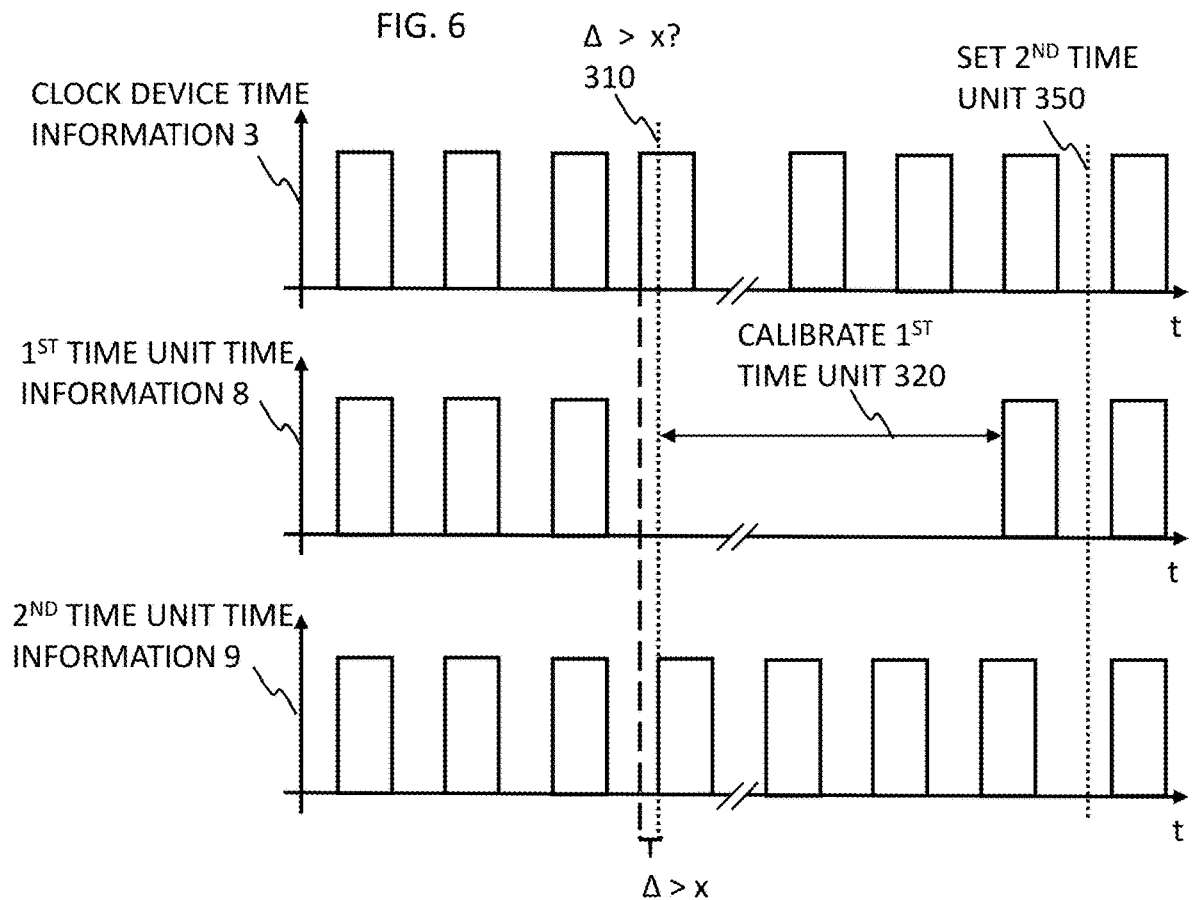

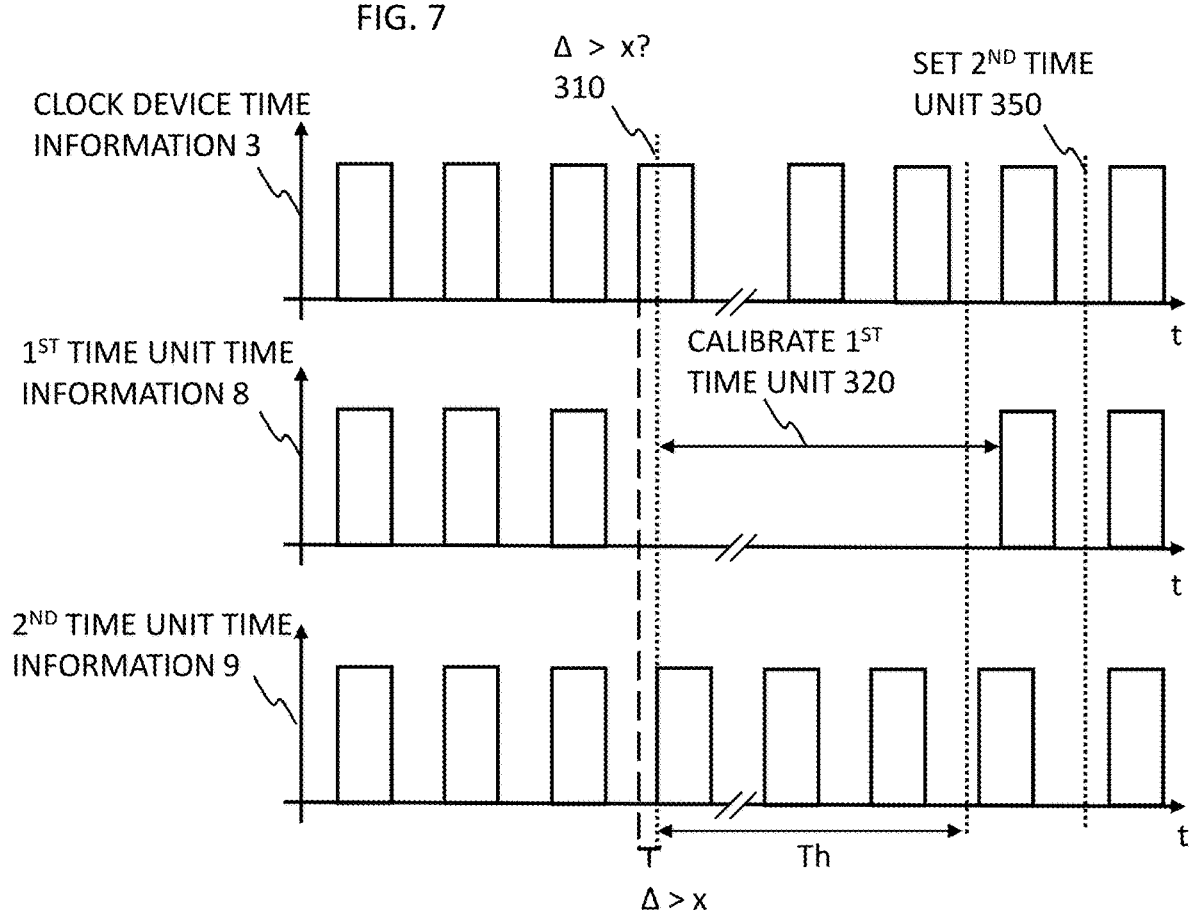

DEVICE AND METHOD FOR PROVIDING A CLOCK SIGNAL TO AN APPLICATION

CROSS-REFERENCE TO RELATED APPLICATIONS

This application claims priority to European Patent Application No. 19173956.4, filed on May 10, 2019, which application is hereby incorporated herein by reference.

TECHNICAL FIELD

The present invention relates to the field of time or frequency synchronization, in particular in power grid automation. In particular, the present invention relates to a method and a device for providing a clock signal to an application, in particular for power grid automation.

BACKGROUND

Time and frequency synchronization is an important task in communication and in industrial automation such as power grid automation. E.g., in power grid automation, with the introduction of digital process level devices and a digital process bus in so-called digital substations, the digital data acquisition is distributed across the substation switchyard. Here, the digital process bus interconnects data acquisition units, such as merging units, with process level or bay level units executing applications such as protection and/or control functions, e.g. synchro check or busbar protection. For such functions, it may be crucial that the digital data acquisition in different data acquisition units throughout the substation is accurately synchronized.

Time synchronization for communication and industrial automation is often performed according to the IEEE 1588 or the IEC 61588 standard. For grid automation, a relevant standard is given by the IEC 61850-9-3 standard. According to these standards, time synchronization class T4, i.e. an accuracy of 4 microseconds, is often required for digital data acquisition for protection applications. Data acquisition units typically comprise a device, such as an ordinary clock according to standards above, that provides a clock signal for time stamping the acquired data and that receives time information from another clock device such as a grand master clock according to the standards above. When the ordinary clock deviates by more than the required accuracy from the grand master clock, it needs to be calibrated before it can provide a valid clock signal to an application again. For such a calibration, several time messages need to be received from the grand master clock before the ordinary clock reaches again a steady state and can provide a valid clock signal. The IEC 61850-9-3 profile allows up to 16 s or 30 s before such a steady state is reached. During this time period, protection and control functions that require data with valid time stamps from the ordinary clock have to be blocked.

SUMMARY

It is an objective of an embodiment of the present invention to provide a method and a device for providing a clock signal to an application, in particular with increased availability. In other words, time periods where no valid clock signal can be provided to the application, in particular during calibration, shall be reduced. During operation, calibration typically occurs often, but not necessarily only, after switching to a master clock from another master clock, e.g. when a connection the other master clock is lost, or when the master clock jumps in time e.g. after reconnection to a GPS satellite.

These objectives are achieved by the subject-matter of the independent claims. Further exemplary embodiments are evident from the dependent claims and the following description. The clock device according to the appended claims and the following description may be a master clock, in particular a grand master clock.

A first aspect of an embodiment of the present invention relates to a, in particular computer-implemented, method for providing a clock signal, which can e.g. be a time signal or a pulse signal, to an application, in particular in an industrial automation and control system, such as a substation or a power grid automation system. This method comprises determining a time difference between a clock device and the clock signal. The time difference may comprise or may be a time offset and/or a drift. If the time difference is above a predetermined threshold, the method further comprises calibrating a first time unit, in particular using the clock device, and, during calibrating the first time unit, using a second time unit for providing the clock signal to the application. In case, the time difference comprises a time offset and a drift, the predetermined threshold may comprise a threshold value for the time offset and for the drift and the time difference may be above the threshold if one of or both of time offset and drift are above the respect threshold value; alternatively, a mathematical combination of drift and time offset may be compared with the pre-determined offset. The first and/or the second time unit can, e.g., be a timer, an oscillator, or a pulse generator that can provide a clock signal, e.g., a time signal in form of a time indication or a pulse signal in form of a pulse-per-second signal. The first and/or the second time unit may be realized as hardware, e.g., comprising a piezo oscillator, as software, e.g., in a microcontroller unit, MCU, or in a computer program, or as firmware, e.g., in a field-programmable gate array, FPGA. The predetermined threshold may be chosen dependent on an accuracy requirement of the application; e.g., it can be 4 microseconds, which corresponds to the T4 accuracy class of the IEC 61850-9-3 profile. Also a lower threshold such as 2 or 3 microseconds could be chosen, in particular to allow for drift of the second time unit during calibrating the first time unit. The method may further comprise, in particular as a first method step, receiving time information from the clock device. Such time information may enable determining the time difference, in particular determining the time difference between the clock signal and the clock device may then be executed using the time information from the clock device. Further, the time difference may be determined using in addition one of the group consisting of time information of the first time unit, time information of the second time unit, and a mean value of time information of the first and the second time unit.

In embodiments, the method may in particular be executed by a device, in particular a device according to a second aspect of an embodiment of the present invention, e.g., the device being one of the group consisting of an ordinary clock, a boundary clock, a data acquisition unit, an intelligent electronic device for automation of a power grid, a merging unit, a bay unit for a distributed busbar protection system, a controller for primary substation equipment, a phasor measurement unit, a communication interface of a non-conventional instrument transformer, a switch, a router, and a multiplexer. The device may comprise the clock device or may be communicatively coupled, e.g. via a communication network, to the clock device. The application may be executed by the same device or a different device, in particular being one of the group consisting of a data acquisition unit, an intelligent electronic device for automation of a power grid, a merging unit, a bay unit for a distributed busbar protection system, a controller for primary substation equipment, a phasor measurement unit, a communication interface of a non-conventional instrument transformer, a switch, a router, and a multiplexer. In embodiments, the application may comprise one or more of the group consisting of time stamping of messages, time stamping of data, in particular measured data such as current measurements and/or voltage measurements, time stamping of Sampled Values and/or GOOSE messages, and control and/or protection of primary substation equipment. The application may further comprise providing the time-stamped data to another application or to a function, e.g. a protection function such as an overcurrent protection function, a line differential function, or a busbar protection function. Such a protection function or also other functions may require time-stamped data only from the device, e.g. in case of an overcurrent protection, or in addition also from a further device, e.g. in case of busbar protection or line differential protection. In embodiments, also the further device may execute the method according to the first aspect of an embodiment of the present invention, in particular the further device may use the same clock device and/or may receive time information from the same clock device as the device, i.e., it may be communicatively coupled to the same clock device.

In the context of embodiments of the present invention, adjusting a time unit to a clock device may in particular mean changing a parameter, such as an absolute time and/or frequency, of the time unit by a control loop such as for example a PD or a PID control loop. Coupling a first time unit and a second time unit may mean a parameter, such as an absolute time and/or a frequency, of the first and the second time unit are controlled to be identical, e.g. in a manner of synchronizing the first and the second time unit. Operating a time unit independently may in particular mean that the time unit does not receive a control signal, is not adjusted to another time unit or clock device, and/or is not coupled with another time unit. Setting a time unit using another time unit and/or a clock device may in particular mean that a parameter, such as an absolute time and/or frequency, of the time unit is set to the corresponding parameter of the other time unit and/or of the clock device. Calibrating the first time unit may in particular comprise receiving consecutive time information from the clock device, in particular by the first time unit and/or a regulator, and adjusting the first time unit to the clock device, until a required accuracy of the first time unit to the clock device is achieved. The consecutive time information from the clock device may for example comprise subsequent time messages from the clock device, which follow one after the other with or without a gap. Using a time unit for providing the clock signal to the application may mean in particular that the clock signal provided to the application is, in particular only, based on time information of the time unit. For example, using the first time unit for providing the clock signal to the application may mean that the clock signal provided to the application is based on time information of the first time unit and is devoid of time information of the second time unit. Vice versa, using the second time unit for providing the clock signal to the application may mean that the clock signal provided to the application is based on time information of the second time unit and is devoid of time information of the first time unit.

In embodiments, the method may further comprise, during calibrating the first time unit, operating the second time unit independently of the clock device and the first time unit. When the second time unit is operated independently, the accuracy of the clock signal may degrade with time due to a drift of the second time unit during independent operation. Accordingly, the method may further comprise, during operating the second time unit independently, declaring the clock signal as valid during a holdover time period and declaring the clock signal as invalid after the holdover time period. In other words, the holdover time period can be understood as a time period in which the clock signal is considered as valid. This may be achieved, in particular by the second time unit, by attaching an indication such as a tag to the clock signal. The holdover time period may be determined based on a relative accuracy and/or an expected drift of the second time unit and, optionally, also on environmental conditions such as temperature or temperature changes that may affect an expected drift of the second time unit. The holdover time period may e.g. be a value between 5 seconds and 2 hours, in particular between 16 s and 30 s.

The method may further comprise, if the time difference is below or equal to the predetermined threshold, adjusting the first time unit and/or the second time unit to the clock device and using the first time unit and/or the second time unit for providing the clock signal to the application.

In embodiments, the first and the second time unit may be in operation in parallel before the time difference is determined. In this case, the method may comprise, if the time difference is below or equal to the predetermined threshold, adjusting the first time unit and the second time unit to the clock device and using the first time unit and/or the second time unit for providing the clock signal to the application. E.g., only the first or the second time unit may be used for providing the clock signal or also the first and the second time unit may be used, for example by calculating a mean value of the first and the second time unit. Accordingly, the method may further comprise, if the time difference is below or equal to the predetermined threshold, coupling the first time unit and the second time unit; and, if the time difference is above the predetermined threshold, decoupling the first time unit and the second time unit.

In other embodiments, one of the first and the second time unit, may only be started or, in particular in case of a software or firmware implementation, may only be created if the time difference is above the predetermined threshold. In this case, the method may further comprise i) if the time difference is below or equal to the predetermined threshold, adjusting the first time unit to the clock device and using the first time unit for providing the clock signal to the application, and, if the time difference is above the predetermined threshold, before calibrating the first time unit, creating or starting the second time unit and, in particular setting the second time unit using the first time unit; or ii) if the time difference is below or equal to the threshold, adjusting the second time unit to the clock device and using the second time unit for providing the clock signal to the application, and, if the time difference is above the predetermined threshold, before calibrating the first time unit, creating or starting the first time unit.

As mentioned above, the clock device can be a master clock, in particular a grand master clock. Such a grand master clock can be in particular according to a standard of the group consisting of IEEE 1588, IEC 61588, and IEC 61850-9-3. The time information from the clock device and/or the clock signal may be provided in form of messages according to a standard of the group consisting of IEEE 1588, IEC 61588, and IEC 61850-9-3.

In embodiments, the first time unit and the second time unit are comprised in an ordinary clock or in a boundary clock. Again, the ordinary clock or the boundary clock may be according to a standard of the group consisting of IEEE 1588, IEC 61588, and IEC 61850-9-3.

In embodiments, the method may further comprise after calibrating the first time unit, setting the second time unit using the first time unit and/or the clock device and in particular coupling the first time unit and the second time unit. Therewith it may be achieved that the first and the second time unit are set to the clock device. This may lead to a jump in the clock signal provided to the application. E.g., in case the device and the further device provide each time-stamped data to a function, setting the second time unit using the first time unit and/or the clock device may be coordinated between the device and the further device such that it is executed simultaneously in the device and the further device. To this end, setting the second time unit using the first time unit may be executed at a pre-determined time after determining the time difference or upon receipt of a coordination signal. The pre-determined time may be chosen such that it can be guaranteed that setting the second time unit using the first time unit may be executed after the first time unit is calibrated. The coordination signal may be sent by the further device to the device, indicating that the first time unit of the further device has been calibrated. The device itself may send a further coordination signal to the further device indicating that its first time unit has been calibrated.

A second aspect relates to a device for providing a clock signal to an application, in particular being adapted to execute the method of the first aspect of an embodiment of the present invention. The device is adapted to receive time information from a clock device and to determine a time difference between the clock signal and the clock device, in particular using the time information, and, if the time difference is above a predetermined threshold, to calibrate a first time unit, in particular using the clock device, and, during calibrating of the first time unit, to use a second time unit for providing the clock signal to the application. In embodiments, the device may be further adapted to, during calibrating of the first time unit, operate the second time unit independently of the clock device and the first time unit. The device may be further adapted to execute the application, e.g., by an application module, or to provide the clock signal to another device adapted to execute the application. In embodiments, the device may comprise the application module. Further, the device may comprise the first time unit and the second time unit. In embodiments, the device may further comprise the clock device or, alternatively, be adapted to be communicatively coupled, e.g., via a communication bus such as a station bus, to the clock device. The device may further comprise a regulator. The regulator may be adapted to receive the time information from the clock device. The regulator may further be adapted to determine the time difference. In this case, the first and/or the second time may provide time information of the respective time unit to the regulator. The regulator may further be adapted to calibrate the first time unit, to adjust the first and/or the second time unit, and/or to set the second time unit using the first time unit. Alternatively, the steps may be executed by the first and/or the second time unit. In embodiments, the second time unit may be adapted to provide the clock signal to the application. The different units of the device such as the first time unit, the second time unit, and/or the regulator, may be communicatively coupled with each other. The device may be one of the group consisting of an ordinary clock, a boundary clock, a switch, a router, a multiplexer, a data acquisition unit, an intelligent electronic device for automation of a power grid such as a merging unit, a bay unit for a distributed busbar protection system, a controller for primary substation equipment, a phasor measurement unit, and a communication interface of a non-conventional instrument transformer.

These and other aspects of the present invention will be apparent from and elucidated with reference to the embodiments described hereinafter.

BRIEF DESCRIPTION OF THE DRAWINGS

The subject-matter of the present invention will be explained in more detail in the following text with reference to exemplary embodiments which are illustrated in the attached drawings.

FIG. 5 schematically illustrates an embodiment of the first aspect of the present invention.

FIG. 6 schematically illustrates by way of example aspects of the present invention.

FIG. 7 schematically illustrates by way of example aspects of the present invention.

The reference symbols used in the drawings, and their meanings, are listed in summary form in the list of reference symbols. In principle, identical parts are provided with the same reference symbols in the figures.

DETAILED DESCRIPTION OF ILLUSTRATIVE EMBODIMENTS

The present invention will be described in more detail with reference to the drawings, in which exemplary embodiments are shown.

Figure 1:
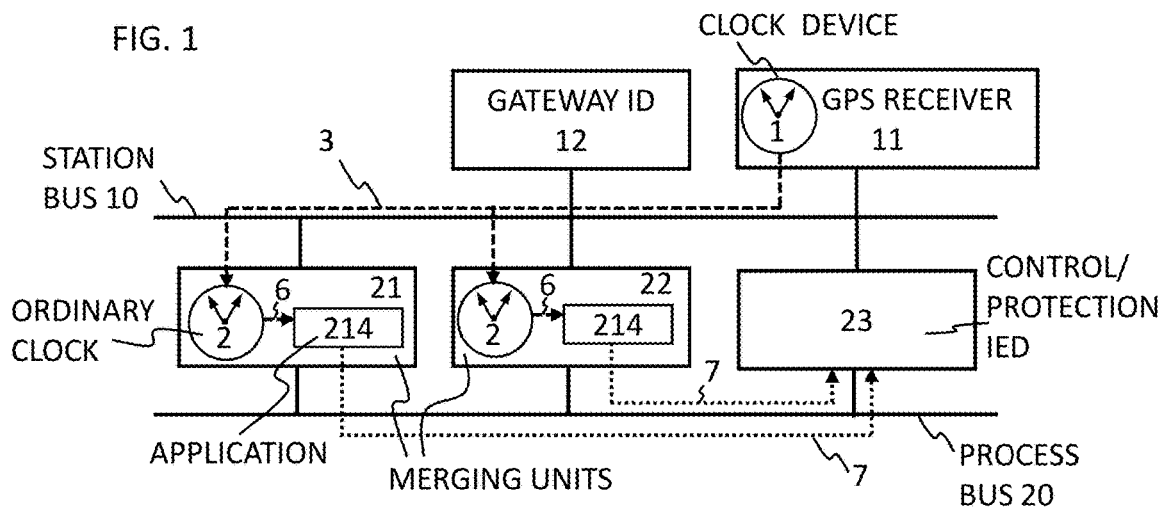
FIG. 1 schematically illustrates by way of example a system for industrial automation in which aspects of the present invention may be implemented.

FIG. 1 schematically depicts by way of example a system for industrial automation, in which aspects of the present invention may be implemented. The system may in particular be a system for grid automation; nevertheless, aspects of the present invention may be equally applied, e.g., in a communication system, in which devices such as routers, switches, multiplexers and the like require a clock signal with high availability, e.g. for time-stamping of messages. The system of FIG. 1 comprises a station bus 10, e.g. of an electrical substation, via which a number of Intelligent Electronic Devices, IEDs, such as a GPS receiver 11, a Human-Machine Interface, HMI, or a gateway IED 12, a data acquisition unit, e.g. a merging unit 21, 22, and/or a control/protection IED 23, are communicatively coupled with each other. The GPS receiver 11 may receive a GPS signal which comprises a very accurate time information and may act as or comprise a clock device 1, in particular a master clock or grand master clock according to a standard of the group consisting of IEEE 1588, IEC 61588, and IEC 61850-9-3. Accordingly, the clock device may send time information 3 via the station bus to an intelligent electronic device such a merging unit 21 and a further merging unit 22.

Such time information 3 may in particular be a message or telegram according to a standard of the group consisting of IEEE 1588, IEC 61588, and IEC 61850-9-3. The device 21 may receive the time information from the clock device 1. Sending and receiving of the time information 3 may be done such that a possible transmission delay of the time information 3 can be compensated. The device 21 may comprise an ordinary clock, in particular according to a standard of the group consisting of IEEE 1588, IEC 61588, and IEC 61850-9-3. The ordinary clock 2 may provide a clock signal 6 to an application/application module 214. An application 214 of a merging unit 21 may comprise time-stamping of current measurements. Accordingly, a time-stamped message 7, such as Sampled Values messages, may then be transmitted to a control/protection IED 23 via a process bus 20. The control/protection IED 23 may execute a function, e.g. a protection function such as an overcurrent protection function using the time-stamped message 7. As illustrated in FIG. 1, the control/protection IED 23 may further receive a time-stamped message 7 from a further device 22 and may execute a function that requires more than one measurement value, e.g. a protection function such as differential protection. In other embodiments, in particular with respect to a communication system, the time information 3 and the time-stamped message 7 may be sent via the same communication bus. The clock signal 6 can be a time signal or a pulse signal. In embodiments, the application does not require a time signal that comprises an absolute time, but just a pulse signal, such as a pulse-per-second signal, that, e.g., enables adjusting of a frequency.

Figure 2:
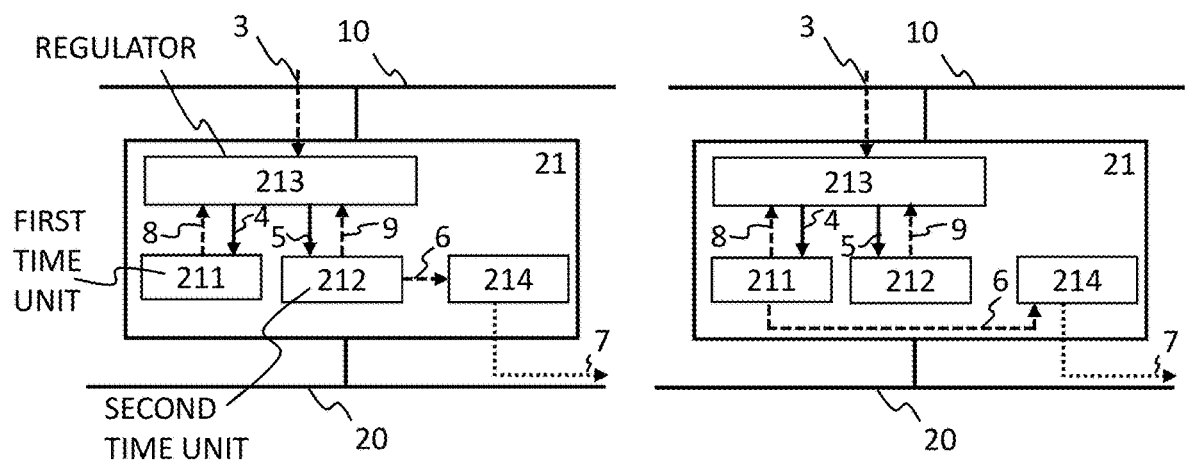
FIG. 2 schematically illustrates an embodiment of the second aspect of the present invention.

FIG. 2 schematically illustrates an embodiment of a device 21 such as a merging unit 21 according to the second aspect of an embodiment of the present invention. As in the system, schematically illustrated in FIG. 1, the device 21 is communicatively coupled to a station bus 10 and a process bus 20. Besides an application/application module 214, the device 21 further comprises a regulator 213, a first time unit 211, and a second time unit 212. Regulator 213, a first time unit 211, and a second time unit 212 can be comprised in an ordinary clock 2. The regulator 213 receives the time information 3 from the clock device 1 via the station bus 10. The second time unit 212 provides a clock signal 6 to the application/application module 214. FIG. 2 illustrates the operation when the time difference between the clock signal 6 and the clock device 1 is below or equal to the predetermined threshold x and/or before the time difference has been determined. Each of the first 211 and the second time unit 212 transmit a time information of the respective time unit 8, 9 to the regulator 213. This can be an indication of an absolute time, such as a time stamp, or a pulse signal such as a pulse-per-second signal. Therewith, the regulator 213 determines a time difference Δ between the time information 3 from the clock device 1 and the clock signal 6. In embodiments, the time difference Δ is determined using the time information of the first time unit 8, using the time information of the second time unit 9, or using a mean value of the time information of the first and the second time unit 8, 9. In case, the time difference Δ is below or equal to the predetermined threshold x of e.g. 3 microseconds, the first 211 and the second time unit 212 may be adjusted to the clock device 1. To this end, the regulator 213 may send a control signal 4, 5 to the first and the second time unit. The control signal 4, 5 may change a parameter of the first and/or the second time unit, e.g., by a PD control loop. As long as the time difference is below or equal to the predetermined threshold, the regulator may further couple the first and the second time unit, i.e., control the first and the second time units such that the time information of the first and second time unit coincide within a margin such as 1 microsecond. This may in particular be achieved by controlling one or more parameters of the first and the second time unit to be identical.

Figure 3:
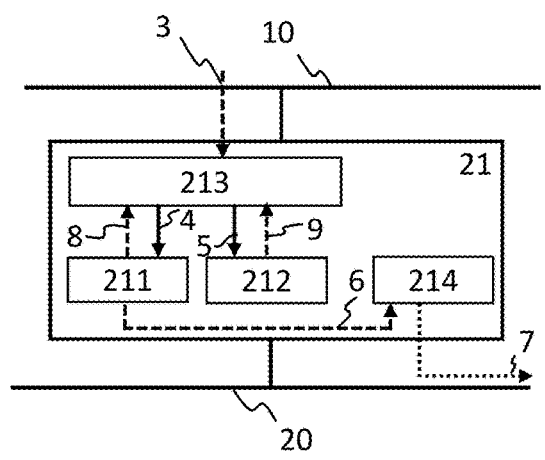
FIG. 3 schematically illustrates an embodiment of the second aspect of the present invention.

FIG. 3 schematically illustrates an alternative embodiment, wherein, if the time difference Δ is below or equal to the predetermined threshold x, the clock signal 6 is provided by the first time unit 211 to the application/application module 214.

Figure 4:
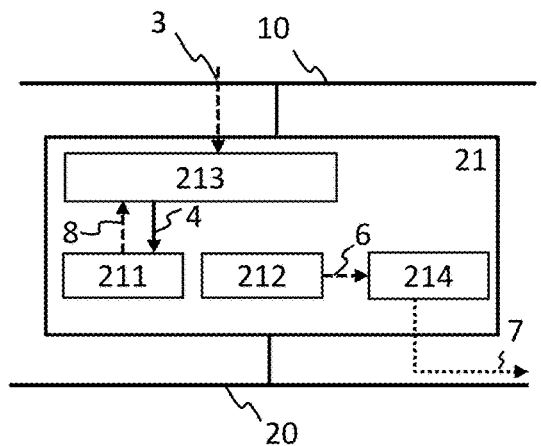
FIG. 4 schematically illustrates an embodiment of the second aspect of the present invention.

FIG. 4 schematically illustrates the device 21 of FIG. 2 or of FIG. 3 if the time difference Δ is above the predetermined threshold x. This may occur e.g. after the clock device 1 jumps in time, for example after a connection of the clock device 1 to a GPS signal or the like is re-established or after receiving a first time information of the clock device 1 e.g. after another clock device went out of service. In this case, the first time unit 211 is calibrated. To this end, the regulator may receive consecutive time information 3 from the clock device 1 and consecutive time information 8 of the first time unit 211, compare them, and send a control signal 4 to the first time unit until the clock and the first time unit coincide within a pre-determined margin and a stable state is reached. Calibrating the first time unit may, e.g., take from 5 to 30 s. During this time, the first time unit 211 cannot provide a valid clock signal; instead, according to the an embodiment of the present invention, the second time unit is used for providing the clock signal 6 to the application/application module 214. Further, during calibration, the second time unit 212 may be operated independently from the clock device and the first time unit; e.g., it may not receive a control signal from the regulator 213.

FIG. 5 depicts an embodiment of the first aspect of an embodiment of the present invention by means of a flow diagram: (a) the time difference Δ is determined in step 310 between the clock device 1 and the clock signal 6. If the time difference Δ is below or equal to the predetermined threshold x, (d) the first and/or the second time unit may be adjusted in step 340 to the clock device and the clock signal may be provided in step 360 to the application 214 using the first 211 and/or the second time unit 212. If the time difference is above the predetermined threshold x, (b) the first time unit 211 is calibrated in step 320 and, during calibrating the first time unit, (c) the second time unit 212 is used in step 330 for providing the clock signal to the application. After calibrating the first time unit 211, (e) the second time unit 212 may be set in step 350 using the first time unit 211 and/or the clock device 1.

FIG. 6 schematically depicts by way of example time information of the clock device 3, time information of the first time unit 8, and time information of the second time unit 9 in the form of pulse-per-second signals. The dotted line 310 indicates the step of determining the time difference Δ between the clock device and the clock signal. The time difference Δ is larger than the predetermined threshold x and the first time unit is calibrated 320. During calibrating the first time unit, the first time unit cannot provide a time information and the second time unit, which is now operated independently, is used for providing the clock signal to the application. The dotted line 350 indicates the step of setting the second time unit using the first time unit or the clock device. FIG. 6 shows that this can result in a jump of the time information of the second time unit 9. In embodiments, setting the second time unit is executed upon receipt of a coordination signal or at a pre-determined time, e.g. between 5 s and 120 s, in particular between 16 s or 30 s, after determining the time difference. Therewith, it can be achieved that the second time unit of a further device according to aspects of an embodiment of the present invention, which is communicatively coupled to the clock device 1, is set at a point in time such that the jump does not negatively affect a function e.g. to which the device and the further device transmit time-stamped messages.

FIG. 7 schematically depicts by way of example time information of the clock device 3, time information of the first time unit 8, and time information of the second time unit 9 in the form of pulse-per-second signals for a further embodiment of the present invention. Here, the time signal or pulse signal is declared as valid during a holdover time period Th and declared as invalid after the holdover time period Th. The holdover time period Th can e.g. be 16 s or 30 s. In the example of FIG. 7, the calibration of the first time unit takes longer than the holdover time period Th; the time signal or pulse signal is then declared to be invalid.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF REFERENCE SYMBOLS

1 clock device, master clock, grand master clock
2 ordinary clock
3 time information of clock device
4 control signal for first time unit
5 control signal for second time unit
6 clock signal, time signal, pulse signal
7 time-stamped message
8 time information of first time unit
9 time information of second time unit
10 station bus
11 GPS receiver
12 HMI/gateway IED
20 process bus
21 device, merging unit
211 first time unit
212 second time unit
213 regulator
214 application, application module
22 further device, further merging unit
23 control/protection IED
Δ time difference
x predetermined threshold
Th holdover time period
t time

What is claimed is:

1. A power grid automation method implemented by a first device for providing a clock signal to an application of the first device, the method comprising:
receiving, by the first device, time information from a clock source device separate from the first device;
determining, by the first device, a time difference between the clock source device and the clock signal; and
in response to the time difference being above a predetermined threshold:
calibrating, by the first device, a first time unit of the first device using the clock source device;
during calibrating the first time unit, and while the clock source device is available to the first device:
decoupling a second time unit of the first device from the first time unit and the clock source device;
using, by the first device, the second time unit of the first device for providing the clock signal to the application of the first device; and
after calibrating the first device is complete, recoupling the second time unit to the first time unit and the clock source device.

2. The method of claim 1, further comprising:
in response to the time difference being below or equal to the predetermined threshold, adjusting the first time unit and/or the second time unit to the clock source device, and using the first time unit and/or the second time unit for providing the clock signal to the application.

3. The method of claim 1, further comprising:
in response to the time difference being below or equal to the predetermined threshold, coupling the first time unit and the second time unit.

4. The method of claim 1, further comprising:
in response to the time difference being above the predetermined threshold, before calibrating the first time unit, creating or starting the first time unit or the second time unit.

5. The method of claim 1, further comprising:
during calibrating the first time unit, operating the second time unit independently of the clock source device and the first time unit.

6. The method of claim 5, further comprising:
during operating the second time unit independently, declaring the clock signal as valid during a holdover time period and declaring the clock signal as invalid after the holdover time period.

7. The method of claim 1, wherein the clock source device is a grand master clock.

8. The method of claim 1, wherein the clock signal is provided in a form of messages according to a standard of the group consisting of: IEEE 1588, IEC 61588, or IEC 61850-9-3.

9. The method of claim 1, wherein the first time unit and the second time unit are disposed in an ordinary clock or a boundary clock.

10. The method of claim 1, further comprising:
after calibrating the first time unit, setting the second time unit using the first time unit and/or the clock source device.

11. The method of claim 10, wherein setting the second time unit using the first time unit and/or the clock source device is executed at a pre-determined time after determining the time difference or upon receipt of a coordination signal.

12. A first device for providing a clock signal to an application of the first device for power grid automation, wherein the first device is configured to:
receive time information from a clock source device separate from the first device;
determine a time difference between the clock signal and the clock source device; and
in response to the time difference being above a predetermined threshold:

calibrate a first time unit of the first device using the clock source device;

during calibrating the first time unit, and while the clock source device is available to the first device:

decouple a second time unit of the first device from the first time unit and the clock source device;

use the second time unit of the first device for providing the clock signal to the application of the first device; and after calibrating the first device is complete, recouple the second time unit to the first time unit and the clock source device.

13. The first device of claim 12, wherein the first device is further configured to:

during calibrating of the first time unit, operate the second time unit independently of the clock source device and the first time unit.

14. The first device of claim 12, wherein the first device is further configured to:

execute the application or to provide the clock signal to a further device configured to execute the application.

15. The first device of claim 12, wherein the first device is one of the group consisting of: an ordinary clock device, a boundary clock device, a data acquisition device, a switch, a router, a multiplexer, an intelligent electronic device for automation of a power grid, a merging device, a bay device for a distributed busbar protection system, a controller for primary substation equipment, a phasor measurement device, or a communication interface of a non-conventional instrument transformer.

16. The first device of claim 12, wherein the first device is further configured to:

in response to the time difference being below or equal to the predetermined threshold, adjust the first time unit and/or the second time unit to the clock source device, and use the first time unit and/or the second time unit to provide the clock signal to the application.

17. The first device of claim 12, wherein the first device is further configured to:

in response to the time difference being below or equal to the predetermined threshold, couple the first time unit and the second time unit.

18. The first device of claim 12, wherein the first device is further configured to:

in response to the time difference being above the predetermined threshold, before calibrating the first time unit, create or start the first time unit or the second time unit.

* * * * *